June 19, 1956 C. W. BERTHIEZ 2,750,851
MILLING AND BORING MACHINE WITH A TILTABLE HEADSTOCK
Filed Aug. 13, 1951 2 Sheets-Sheet 2
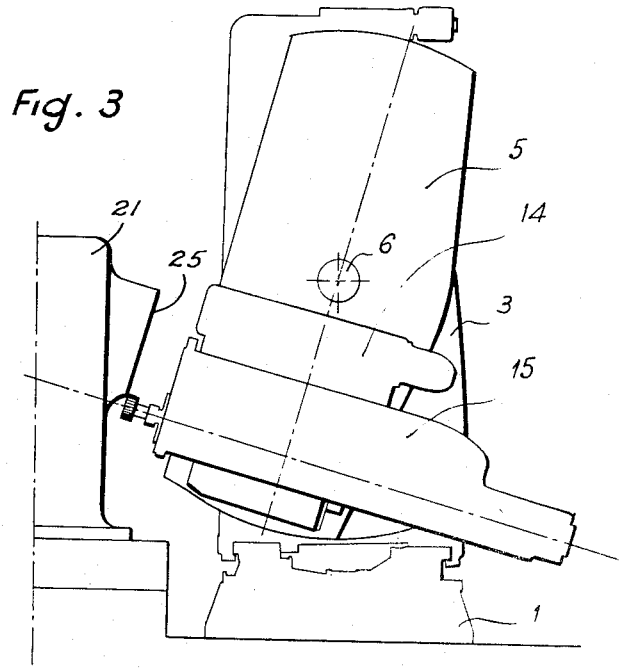
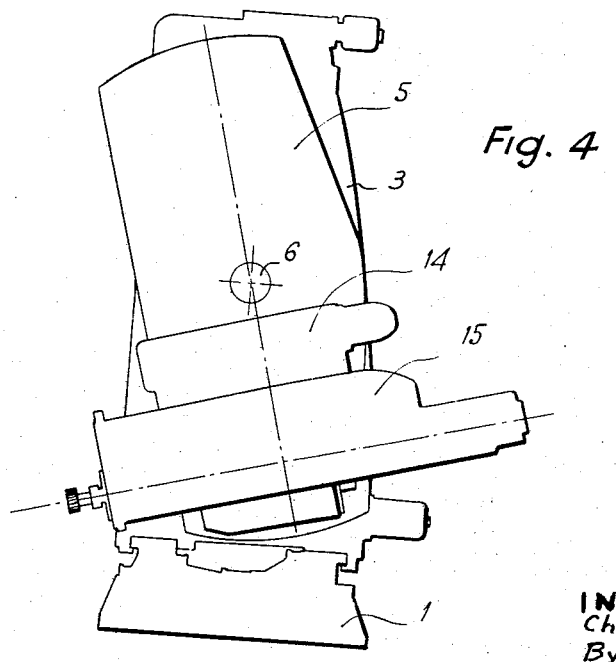
INVENTOR
Charles William Berthiez
By George H. Carey
ATTORNEY

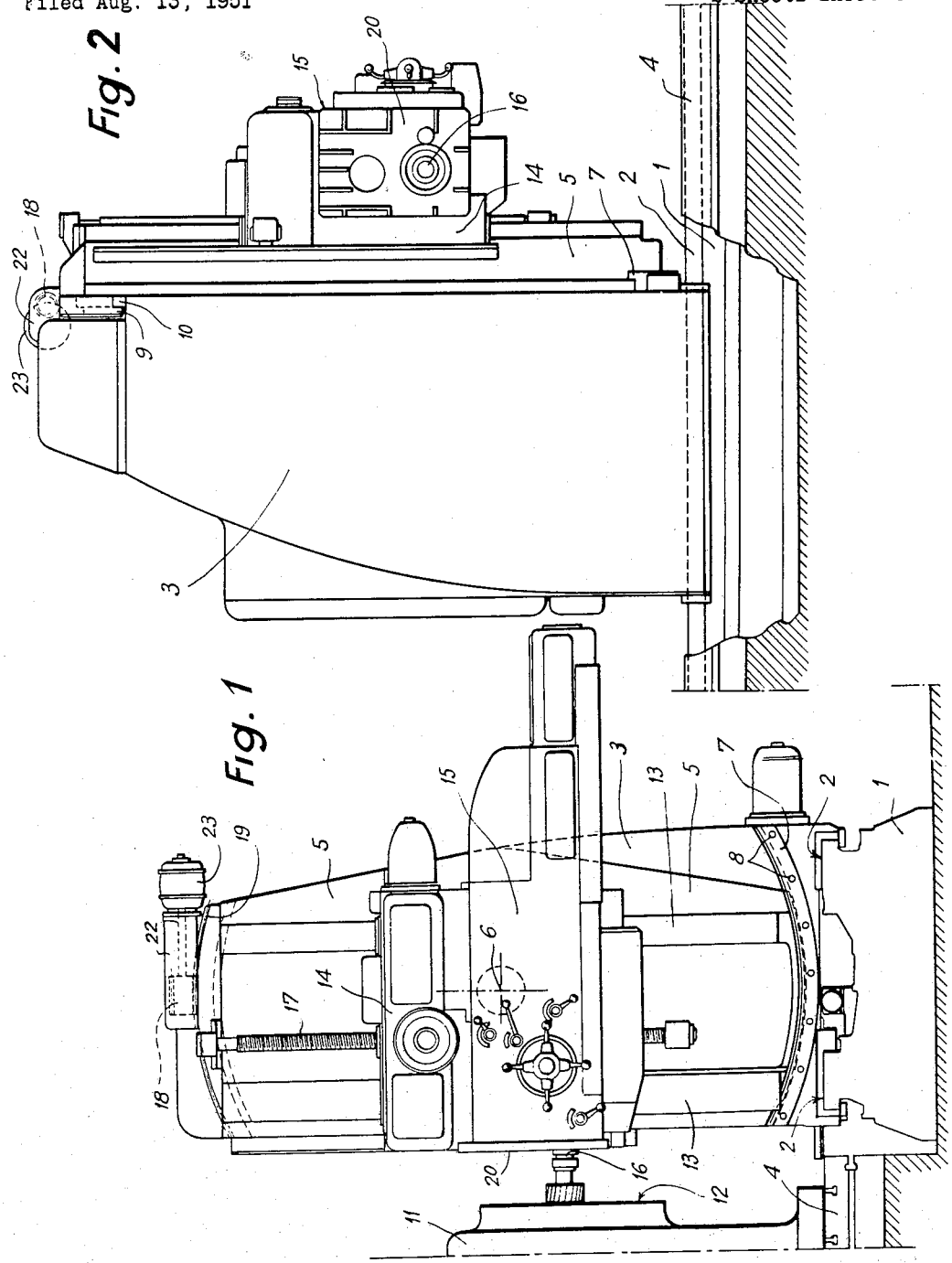

United States Patent Office 2,750,851
Patented June 19, 1956

2,750,851

MILLING AND BORING MACHINE WITH A TILTABLE HEADSTOCK

Charles William Berthiez, La Cote Bizy Vernon, France, assignor to Societe Anonyme dite: Societe Nouvelle de Construction de Machines-Outils et d'Outillages Procédés C. W. B., Paris, France Application August 13, 1951, Serial No. 241,680

Claims priority, application France May 30, 1951

6 Claims. (Cl. 90—17)

The invention relates to milling and boring machines and particularly to those which are provided with a tiltable headstock.

In some embodiments, which are already known, the headstock of the machine is adapted to be shifted up and down a vertical upright member and also to be tilted about an horizontal axis. This organization allows of drilling, boring and tapping operations to be effected on a workpiece in a slanting direction, but it does not permit the surfacing of inclined portions by means of a milling cutter carried by the spindle of the machine since the headstock is shiftable along the upright member in a vertical direction only.

The milling and boring machine according to the present invention has been designed to eliminate this disadvantage. For this purpose, it has been provided with a swivelling plate arranged on a front face of the upright member, said plate being fitted with runways on which the milling and boring headstock is adapted to slide.

Preferably, the direction of the runways provided on the plate is at right angles to the direction of the headstock spindle.

Other features of the invention will appear from the following specification and from the accompanying drawings given only by way of examples and in which:

Fig. 1 is a front view of an embodiment of a milling and boring machine with a tiltable headstock according to the invention, the headstock being shown in its horizontal position;

Fig. 2 is a corresponding side view; and

Figs. 3 and 4 show, on a smaller scale, the outline of the machine for two different inclined positions of the headstock respectively.

According to one embodiment of the invention, the milling and boring machine with a tiltable headstock comprises a bed 1 (see Figs. 1 and 2) provided with horizontal runways 2 on which a column 3 is adapted to be shifted by means of a device of any known type, for instance a screw and nut device. Beside the bed 1 is arranged a floor-plate or base 4 adapted to support the workpiece 11 to be machined.

A plate 5 is mounted against a vertical face of column 3 and is adapted to swivel about an element or stud disposed on a horizontal axis shown at 6 in the drawing. The swivelling plate 5 is engaged by and held against the column at its lower portion by means of an arcuate flange 7, the center of which is located on the axis 6, and at its upper portion, by means of a flange 9 also in the shape of an arc having the same center and which is fastened to said swivelling plate. Flange 9 is in engagement with a cooperating rib or fillet 10 carried by the column 3.

The swivelling plate 5 is provided with vertical slideways 13 along which a slide 14 is adapted to move, said slide being fitted with horizontal slideways on which a headstock 15 provided with a milling and boring spindle 16 is adapted to slide. The shifting of said headstock on its slide, as well as the shifting of the slide on the swivelling plate is ensured by any driving means such as, for instance, a screw and nut device. The drawing shows the screw 17 which drives the slide 14 along the runways 13 of the swivelling plate 5.

The swivelling motion of plate 5 on column 3 takes place through a worm 18 which is in mesh with a toothed segment 19 secured to said swivelling plate and co-axial with the pivoting axis of plate 5. The worm 18 is mounted in a casing 22 carried by column 3 and containing a reducing gear (not shown) driven, for instance, by an electric motor 23.

Preferably, headstock 15 has a machined and trued face 20 adapted to receive a number of attachments which lend themselves to a great variety of machining operations owing to the fact that said machined and trued face can be tilted through the swivelling motion of plate 5 and shifted parallelly to itself.

The operation of the machine, the essential parts of which have just been described, is self-explanatory.

Fig. 1 shows the position of the machine parts in which the slideways 13 of the swivelling plate run vertically so that the slide 14 carrying the headstock is adapted to move on the swivelling plate in a vertical direction along the runways 13. This position makes it possible to effect face milling operations in vertical planes, such as plane 12 of the workpiece 11 placed on floor-plate or base 4. When it is desired to face mill an inclined surface, for instance, face 25 of the workpiece 21 shown on Fig. 3, it is sufficient to tilt plate 5 by the required angle. On this figure, headstock 15 is shown inclined on one side relative to the vertical direction, but in the machine shown, it is possible to tilt the headstock also in the opposite direction by oppositely tilting plate 5, see Fig. 4.

Clamping devices of any known types are provided to firmly clamp together the various machine members in any given position, and particularly swivelling plate 5 on column 3.

Of course, the invention is not limited to the embodiment described and shown, but has been given only as an example. Thus in the example chosen, the milling and boring headstock 15 is adapted to be shifted on an intermediary slide 14 in a direction parallel to the axis of the spindle 16, this slide being carried by the swivelling plate 5, but it goes without saying that a machine in which the headstock were adapted to slide directly along the runways 13 of the swivelling plate would remain within the scope of the present invention.

What I claim is:

1. A machine tool comprising a work piece supporting base providing a surface in a horizontal plane on which to support a work piece, an upright disposed adjacent and offset horizontally from said work piece supporting base in a given direction, a pivot stud supported by said upright with its pivotal axis horizontal and above said horizontal plane surface of said base, said pivot stud being disposed with its axis transverse to said given direction, an elongated member supported adjacent the center of its length on said pivot stud for pivotal movement of said member on said stud axis to and from positions of said member at either side of a vertical middle position, said elongated member providing thereon a slideway disposed in a plane perpendicular to said pivotal axis and extending vertically in said middle position and inclined to the vertical in positions at either side of said middle position, said slideway of said member in any of said positions having a substantial extent lengthwise of said member with a major portion of said length extending above said horizontal surface of said work piece supporting base, a headstock supported by said member for movement of said headstock along said slideway of said member upwardly and downwardly in any of the several angularly related positions of said member and its slideway about said pivotal axis, a tool carrying spindle supported by said headstock for rotation thereof on its axis with said axis of said spindle in a plane perpendicular to said pivotal axis of said member, said spindle extending parallel to its axis transversely of the length of said slideway of said member toward said work piece supporting base in cantilever relation to said upright, and means operatively connected to said upright and to said pivotally supported elongated member and operable to effect said pivotal movement of said member on said stud to and from said positions at either side of the vertical.

2. A machine tool as defined in claim 1 in which said upright has a vertical extent similar to that of said elongated pivoted member in said middle position and is provided with lower and upper arcuate guideways extending about said pivotal axis of said member, said member providing lower and upper portions respectively disposed in spaced relation to said pivotal axis toward the respective ends of said member and respectively movable along said arcuate guideways of said upright in the pivotal movement of said member, said portions respectively engaging said guideways in the different positions of said member at either side of and in said middle vertical position.

3. A machine tool comprising a base providing a surface in a horizontal plane on which to support a work piece, a bed providing thereon a horizontally extending slideway adjacent and offset horizontally from said base in the direction perpendicular to the length of said slideway, an upright supported on said bed for movement thereof along said slideway of said bed to different positions thereon, a member supported on said upright for pivotal movement thereof on a horizontal axis to and from positions of said member at either side of a middle position, said axis being parallel to the length of said bed slideway, said member providing thereon a slideway disposed in a plane perpendicular to said pivotal axis and extending vertically in said middle position and inclined to the vertical in positions at either side of said middle position, said slideway of said member in any of said positions having a substantial lengthwise extent upwardly from said bed above said base surface, a headstock supported by said member for movement of said headstock along said slideway of said member upwardly and downwardly in any of the several angularly related positions of said member and its slideway about said pivotal axis, and a tool carrying spindle supported by said headstock for rotation thereof on its axis with said axis in a plane perpendicular to said pivotal axis of said member, said spindle axis extending transversely of the length of said slideway of said member.

4. A machine tool as defined in claim 1 in which said means operable to effect said pivotal movement of said member comprises an arcuate toothed segment carried by said member coaxial with said pivotal axis of said member, and a worm supported by said upright for rotation thereof on its axis and in meshing engagement with said arcuate segment and operable for effecting movement of said segment along its arc to effect said pivotal movement of said member on its axis.

5. A machine tool as defined in claim 1 in which said headstock is provided with a machined and trued surface extending transversely of said spindle axis and extending about said spindle axis for attachment to said headstock of tool carrying fixtures.

6. A machine tool as defined in claim 1 which comprises a slide supported by said pivoted member for movement of said slide along said slideway of said pivoted member upwardly and downwardly in any of the several angularly related positions of said member slideway, said slide providing thereon a slideway extending at right angles to said slideway of said pivoted member in a plane perpendicular to the pivotal axis of said member, said headstock being supported by said slide for movement of said headstock along said slideway of said slide to and from different positions in cantilever relation to said upright, said tool carrying spindle being supported by said headstock with said axis thereof parallel to said slideway of said slide.

References Cited in the file of this patent

UNITED STATES PATENTS

| Number | Name | Date |
| --- | --- | --- |
| 112,626 | Perrin et al. | Mar. 14, 1871 |
| 596,670 | Tyberg | Jan. 4, 1898 |
| 1,696,660 | Wegner | Dec. 25, 1928 |
| 2,052,271 | Archea | Aug. 25, 1936 |
| 2,388,872 | Scarff | Nov. 13, 1945 |

FOREIGN PATENTS

| Number | Country | Date |
| --- | --- | --- |
| 163,814 | Great Britain | of 1921 |
| 177,620 | Great Britain | Apr. 6, 1922 |
| 871,979 | France | May 23, 1942 |